United States Patent [19]
Giovanardi

[11] Patent Number: 5,683,042
[45] Date of Patent: Nov. 4, 1997

[54] MOBILE COMPACTOR, PULVERIZER AND CUTTING APPARATUS AND METHOD THEREFOR

[76] Inventor: Enrico Giovanardi, 333 W. Lemarche Ave., Phoenix, Ariz. 85023

[21] Appl. No.: 623,870

[22] Filed: Mar. 29, 1996

[51] Int. Cl.[6] .......................... B02C 13/04; B02C 21/02
[52] U.S. Cl. ................. 241/27; 241/101.76; 241/189.1; 241/194
[58] Field of Search .................. 241/27, 101.76, 241/189.1, 194, DIG. 38

[56] References Cited

U.S. PATENT DOCUMENTS

| | | | |
|---|---|---|---|
| 529,874 | 11/1894 | Parker | 241/194 X |
| 3,011,220 | 12/1961 | Keller et al. | 241/194 X |
| 3,270,968 | 9/1966 | Hess et al. | 241/189.1 |
| 5,377,919 | 1/1995 | Rogers et al. | 241/189.2 |
| 5,562,257 | 10/1996 | Graveman et al. | 241/190 |

*Primary Examiner*—John M. Husar
*Attorney, Agent, or Firm*—Donald J. Lenkszus; O'Connor Cavanagh

[57] ABSTRACT

The present invention is directed to an apparatus and method for compacting and pulverizing waste and soil, including a mechanism for cutting wire, tubing, hoses, plastics, carpet, mattresses, and other like materials that tend to be present at landfill and other waste sites and that can interfere with the operation of a compacting and pulverizing apparatus. The mobile compactor, pulverizer and cutting method achieves superior performance in terms of increased compacting ability by using a plurality of compacting and pulverizing members that are mounted rotatably on a plurality of rods running parallel to a main shaft, which compacting and pulverizing members rotate about the main shaft during operation to compact and pulverize waste and soil and other materials.

25 Claims, 2 Drawing Sheets

MOBILE COMPACTOR, PULVERIZER AND CUTTING APPARATUS AND METHOD THEREFOR

BACKGROUND OF THE INVENTION

Field of Invention This invention relates generally to an apparatus and method for compacting and pulverizing waste and soil and, more specifically, to a mobile compactor and pulverizer and method for compacting and pulverizing waste and soil, particularly at landfill sites, and for cutting wiring, tubing, hoses, plastics mattresses, carpet and other like waste products that tend to interfere with the operation of any compactor and pulverizer apparatus operating in an environment where such materials are present. The mobile compactor, pulverizer and cutting apparatus of the present invention, in its preferred embodiment, has a plurality of compacting and pulverizing members that are mounted rotatably on a plurality of rods running parallel to a main shaft, which compacting and pulverizing members rotate about the main shaft during operation to compact and pulverize waste and soil and other materials. Where the mobile compactor and pulverizer apparatus is used in an environment, for example a landfill, where wire, tubing, hoses, plastics, carpet, mattresses, or other like materials are present, such materials tend to become entangled at one or both of the ends of the main shaft rotating the compacting and pulverizing members. To prevent such entanglement and to permit the uninterrupted operation of the mobile compactor and pulverizing apparatus in a environment where such materials are present, the mobile compactor, pulverizer and cutting apparatus and method of the present invention features cutting means preferably displaced at both ends of the main shaft to cut wire, tubing, hoses, plastics, carpet, mattresses and other like materials before such materials can come into contact with the portion of the apparatus that turns the main shaft which would interfere with the orderly operation of the mobile compacting, pulverizing and cutting apparatus.

BACKGROUND OF THE INVENTION

Mobile compacting apparatuses are well known in the art. Whether incorporated into a vehicle or attached to a vehicle as a trailer, such apparatuses are used to compact debris and to smooth rough areas.

Use of a compacting apparatus in a landfill environment presents special challenges. There are several stages to a compacting process at a landfill. First, it is necessary to compact the waste product that is being dumped at the landfill. As is to be expected, such waste product can take many forms, including for example typical, rather small household garbage items (e.g., food containers, food waste, old newspapers, etc.) to larger items from businesses or construction sites. With respect particularly though not exclusively to the latter, it is not uncommon for wire, tubing, hoses, plastics, carpet, mattresses, and other like debris to be dumped at a landfill site. After the waste product is compacted, the compactor apparatus must then compact onto the layer of waste a layer of soil, upon which another layer of waste will ultimately be placed—a process that typically will repeat itself until the landfill reaches its maximum desired or lawful height.

Because virtually all landfills face maximum landfill height restrictions, and because it can often be politically and/or financially difficult to expand or enlarge existing landfills or create new ones, it is preferable for the compactor apparatus to compact the waste and soil layers as much as possible, so that the landfill may be utilized as efficiently as possible. Existing compactors lack the ability to efficiently pulverize waste in a landfill setting, a function necessary to achieve optimal density and thus the most efficient use of the landfill.

Certain types of waste typically present in landfills have prevented the efficient use of compactors having a pulverizing capability in a landfill setting. Thus, it often happens that where wire, tubing, hoses, plastics, carpet, mattresses, and other like materials are present in the compacting landfill or area environment, such material can interfere with the operation of the compacting apparatus. For example, where the compactor and pulverizing apparatus features a compacting and/or pulverizing member or members, such compacted materials can bind up the machine so as to prevent the compacting and/or pulverizing member or members from doing their work.

Therefore, a need existed for an improved combined mobile compactor and pulverizer apparatus and method for compacting and pulverizing waste and soil, particularly at landfill and other sites where wire, hoses, tubing, plastics, carpet, mattresses, and other like materials can be present. The improved compactor and pulverizing apparatus and method must be able to efficiently and densely compact and pulverize most waste products and soil. The improved compactor and pulverizer apparatus and method must also be able to cut wire, hoses, tubing, plastics, carpet, mattresses, and other like materials so that these materials and other present waste products can be densely compacted, pulverized and cut without any unnecessary interference in the operation of the mobile compactor, pulverizer and cutting apparatus.

SUMMARY OF THE INVENTION

It is an object of the present invention to provide an improved combined mobile compactor, pulverizer and cutting apparatus and method therefor.

It is another object of the present invention to provide an improved combined mobile compactor, pulverizer and cutting apparatus and method that will permit the dense compacting and cutting of waste and soil.

It is still another object of the present invention to provide an improved combined mobile compactor, pulverizer and cutting apparatus and method that is capable of operating without substantial interference in an environment where wire, tubing, hoses, plastics, carpet, mattresses, or other like materials are present.

BRIEF DESCRIPTION OF THE PREFERRED EMBODIMENTS

In accordance with one embodiment of the present invention, an improved combined mobile compactor, pulverizer and cutting apparatus is disclosed. The apparatus is comprised of: a substantially horizontal main shaft located within a substantially rectangular housing; a first shaft receiving member and a second shaft receiving member located within the housing; a first end of the main shaft being rotatably connected to the first shaft receiving member located in a first wall of the housing and a second end of the main shaft being rotatably connected to the second shaft receiving member located in a second wall of the housing, the first and second walls of the housing being opposite each other; shaft driving means coupled to the main shaft for rotating the main shaft; a plurality of cylindrical spacing members displaced at substantially equal distances along the main shaft, the plurality of cylindrical spacing members including a first spacing member located substantially at the first end of the main shaft, a second spacing member located substantially at the second end of the main shaft, and multiple spacing members located between the first spacing member and the second spacing member; each of the plurality of spacing members having at least two openings therethrough displaced substantially equal distances from each other, the openings through each of the plurality of spacing members aligned with the corresponding at least two openings in each other of the plurality of spacing members; at least two rods displaced parallel to the main shaft, each of the rods passing through the aligned openings in the plurality of spacing members; a plurality of compacting members rotatably connected to each of the two rods; two of the plurality of spacing members bounding the plurality of compacting members, each of the plurality of compacting members located between the two spacing members; a first annular member circumscribing the first end of the main shaft and connected to the first wall of the housing, the first annular member having a width that is greater than the distance between the first wall and a proximate side of one of the two spacing members that is located closest to the wall and less than the distance between the first wall of the housing and a distal side of the spacing member that is located closest to the first wall; first cutting means connected to at least one of the first annular member and the first wall for cutting or slicing wiring, tubing, hoses, carpet, plastics, mattresses, and other debris; second cutting means connected to the distal side of the one of the two spacing members that is located closest to the first wall for cutting or slicing wiring, tubing, hoses, carpet, plastics, mattresses, and other debris in combination with the first cutting means; a second annular member circumscribing the second end of the main shaft and connected to the second wall of the housing, the second annular member having a width that is greater than the distance between the second wall and a proximate side of the other of the two spacing members that is located closest to the second wall and less than the distance between the second wall of the housing and a distal side of the other of the two spacing members that is located closest to the second wall; third cutting means connected to at least one of the second annular member and the second wall for cutting or slicing wiring, tubing, hoses, carpet, plastics, mattresses, and other debris; and fourth cutting means connected to the distal side of the other of the two spacing members that is located closest to the second wall for cutting or slicing wiring, tubing, hoses, carpet, plastics, mattresses, and other debris in combination with the third cutting means.

In accordance with another embodiment of the present invention, an improved combined mobile compactor, pulverizer and cutting apparatus is disclosed. The apparatus is comprised of: a plurality of rotatable compacting member means mounted between two spaced apart walls of the apparatus for compacting material coming in contact with the plurality of rotatable compacting member means; a plurality of rotatable cutting means mounted between two spaced apart walls of the apparatus for cutting the material coming in contact with the plurality of rotatable compacting members; and annular shield means connected to two spaced apart walls of the apparatus for preventing material that is being compacted and cut by the apparatus from interfering with and slowing down rotation of both the plurality of rotatable compacting member means and the plurality of rotatable cutting means.

In accordance with still another embodiment of the present invention, an improved method for compacting and cutting waste and soil is disclosed. The method comprises the steps of: providing a substantially horizontal main shaft located within a substantially rectangular housing; providing a first shaft receiving member and a second shaft receiving member located within the housing; rotatably connecting a first end of the main shaft to the first shaft receiving member located in a first wall of the housing and rotatably connecting a second end of the main shaft to the second shaft receiving member located in a second wall of the housing, the first and second walls of the housing being opposite each other; providing shaft driving means coupled to the main shaft for rotating the main shaft; providing a plurality of cylindrical spacing members displaced at substantially equal distances along the main shaft, the plurality of cylindrical spacing members including a first spacing member located substantially at the first end of the main shaft, a second spacing member located substantially at the second end of the main shaft, and multiple spacing members located between the first spacing member and the second spacing member; providing at least two openings through each of the plurality of spacing members displaced substantially equal distances from each other and aligning the openings through each of the plurality of spacing members with the corresponding at least two openings in each other of the plurality of spacing members; providing at least two rods displaced parallel to the main shaft, each of the rods passing through the aligned openings in the plurality of spacing members; providing a plurality of compacting members rotatably connected to each of the two rods; providing two of the plurality of spacing members bounding the plurality of compacting members, each of the plurality of compacting members located between the two spacing members; providing a first annular member circumscribing the first end of the main shaft and connected to the first wall of the housing, the first annular member having a width that is greater than the distance between the first wall and a proximate side of one of the two spacing members that is located closest to the wall and less than the distance between the first wall of the housing and a distal side of the spacing member that is located closest to the first wall; connecting first cutting means to at least one of the first annular member and the first wall for cutting or slicing wiring, tubing, hoses, carpet, plastics, mattresses, and other debris; connecting second cutting means to the distal side of the one of the two spacing members that is located closest to the first wall for cutting or slicing wiring, tubing, hoses, carpet, plastics, mattresses, and other debris in combination with the first cutting means; providing a second annular member circumscribing the second end of the main shaft and connected to the second wall of the housing, the second annular member having a width that is greater than the distance between the second wall and a proximate side of the other of the two spacing members that is located closest to the second wall and less than the distance between the second wall of the housing and a distal side of the other of the two spacing members that is located closest to the second wall; connecting third cutting means to at least one of the second annular member and the second wall for cutting or slicing wiring, tubing, hoses, carpet, plastics, mattresses, and other debris; and connecting fourth cutting means to the distal side of the other of the two spacing members that is located closest to the second wall for cutting or slicing wiring, tubing, hoses, carpet, plastics, mattresses, and other debris in combination with the third cutting means.

In accordance with a still further embodiment of the present invention, an improved method for compacting and cutting waste and soil is disclosed. The method comprises the steps of: mounting a plurality of rotatable compacting member means between two spaced apart walls of the apparatus for compacting material coming in contact with the plurality of rotatable compacting member means; mounting a plurality of rotatable cutting means between two spaced apart walls of the apparatus for cutting the material coming in contact with the plurality of rotatable compacting members; and connecting annular shield means to two spaced apart walls of the apparatus for preventing material that is being compacted and cut by the apparatus from interfering with and slowing down rotation of both the plurality of rotatable compacting member means and the plurality of rotatable cutting means.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
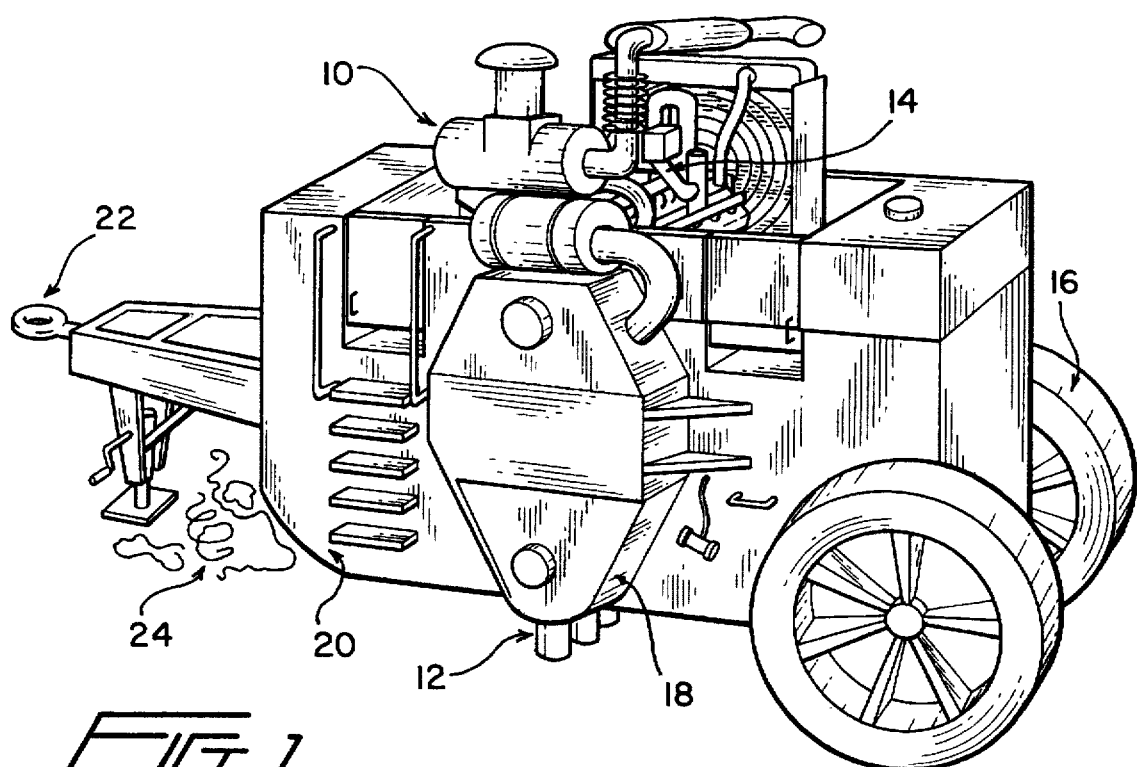
FIG. 1 is a perspective view of the preferred embodiment of the combined mobile compactor, pulverizer and cutting apparatus of the present invention.

Referring to the embodiment of FIG. 1, reference number 10 refers generally to the combined mobile compactor, pulverizer and cutting apparatus of this invention. Referring to FIG. 1, the compactor, pulverizer and cutting apparatus 10 comprises a hammermill 12 (which will be described more specifically below in reference to FIGS. 2–5), a power plant 14 for providing a means for operating the compactor, pulverizer and cutting apparatus 10, compactor wheels 16 (only one of which is shown), a clutch and transmission apparatus 18, a chassis or housing 20, and a coupling member 22. As shown in FIG. 1, the compactor, pulverizer and cutting apparatus 10 is shown in a setting where debris 24 is present.

In the preferred embodiment, the power plant 14 is a Caterpillar 3408 TA diesel powerplant, which delivers 465 bhp. However, the power plant 14 may comprise a different powerplant capable of producing substantially the same amount of bhp without departing from the spirit or scope of the present invention. The compactor wheels 16 may be comprised of steel or rubber. The compactor wheels 16 are necessary to give the compactor, pulverizer and cutting apparatus 10 increased stability during operation and also to assist in the compacting process. The clutch and transmission apparatus 18 comprises a transmission having flexible joints and a drive belt so as to give the compactor, pulverizer and cutting apparatus 10 enhanced resistance to impacts during operation, and a heavy duty pneumatic clutch that will allow the hammermill 12 to begin rotating slowly and that will release automatically when a difference in rotation speed between the power plant 14 and the hammermill 12 occurs. Without departing from the spirit or scope of the invention, the pneumatic clutch may be replaced with a torque converter. The housing 20 is preferably comprised of thick, heavy grade steel and constructed to be able to withstand the type of punishing treatment that can be encountered during operation of the compactor, pulverizer and cutting apparatus 10 in a landfill or other similar environment. The coupling member 22 is in the form of an eyelet, and permits the compactor, pulverizer and cutting apparatus 10 to be releasably coupled to a tractor or other vehicle that has the ability to pull the compactor, pulverizer and cutting apparatus 10 during operation.

Figure 2:
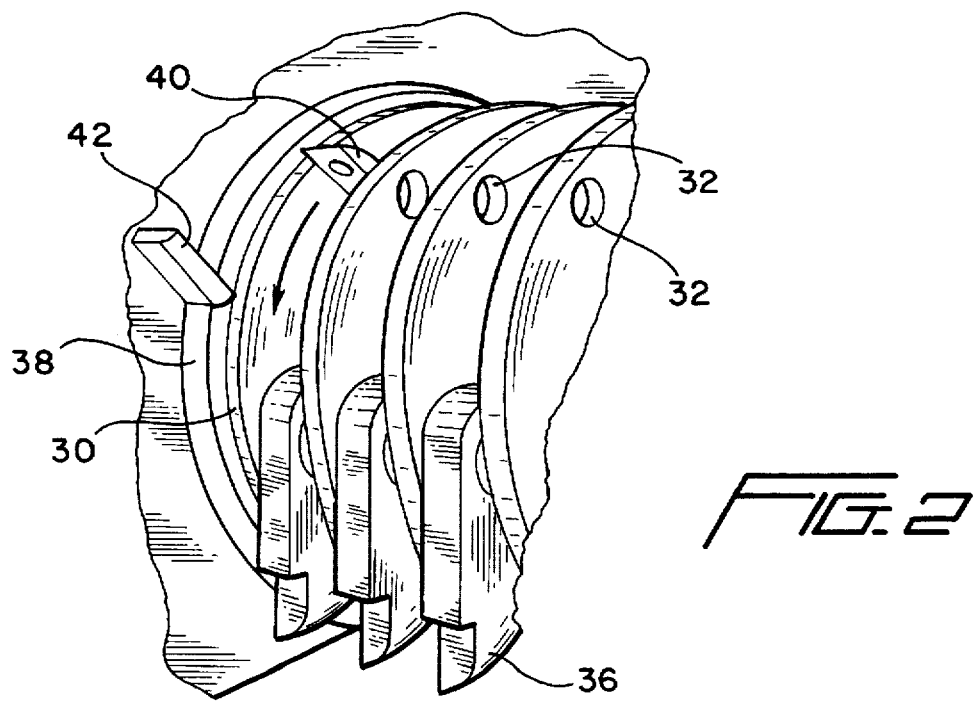
FIG. 2 is a partial, perspective view of the present invention, showing a portion of the compactor members, spacing members, and cutting means of the present invention.
Figure 3:
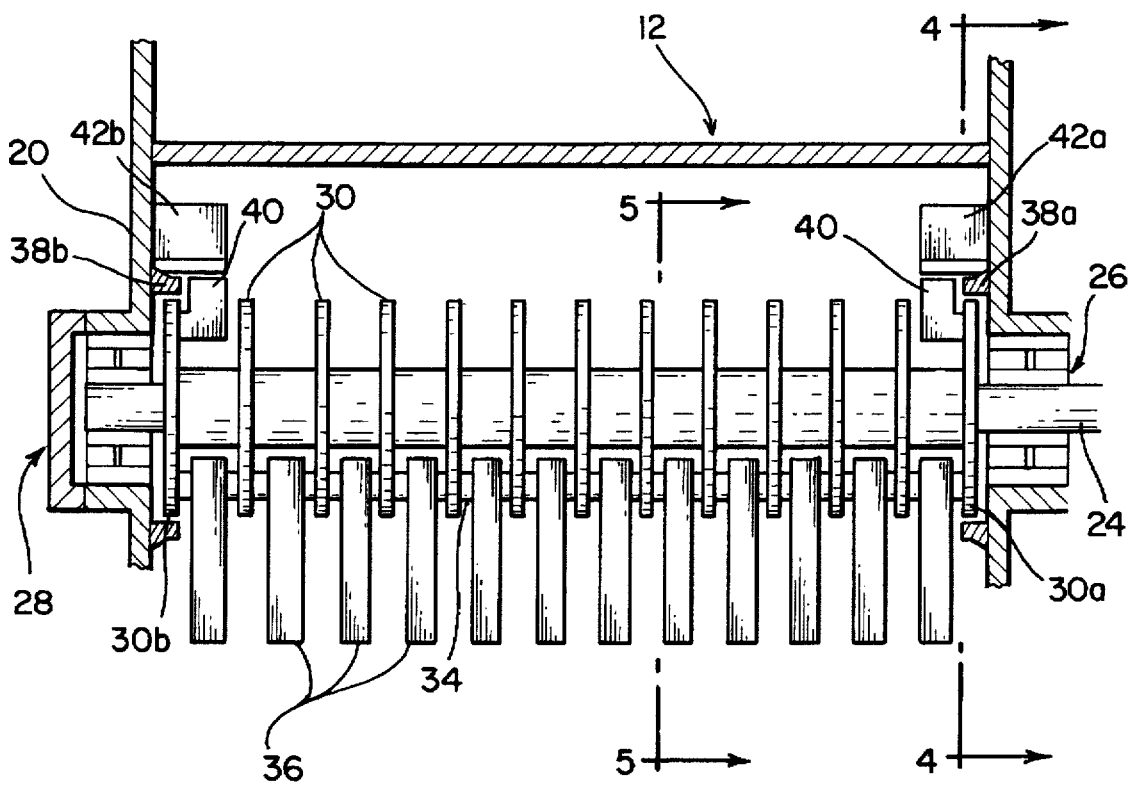
FIG. 3 is a front view of the present invention, showing the main shaft, compactor members, spacing members, and cutting means of the present invention.
Figure 4:
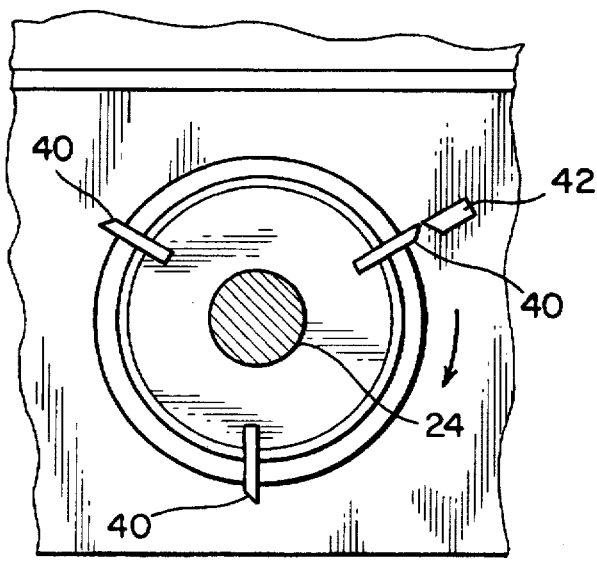
FIG. 4 is a cross-sectional view of the compacting and cutting portion of the present invention, taken along line 4—4 of FIG. 3 and showing the cutting means of the present invention.
Figure 5:
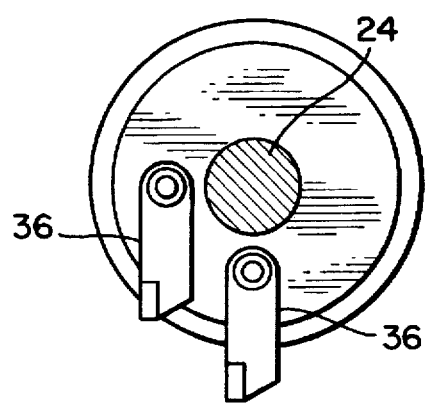
FIG. 5 is a cross-sectional view of the compacting and cutting portion of the present invention, taken along line 5—5 of FIG. 3 and showing two compacting members connected to a spacing member.

Referring generally to FIGS. 2–5, the hammermill 12 is located within a substantially rectangular housing 20 and comprises a main shaft 24, a first or right shaft receiving member 26, a second or left shaft receiving member 28 (whereby the right end of the main shaft 24 is rotatably connected to the first or right shaft receiving member 26 and the left end of the main shaft 24 is rotatably connected to the second or left shaft receiving member 28), and a plurality of cylindrical spacing members 30 displaced at substantially equal distances along the main shaft 24. Each of the cylindrical spacing members 30 has therethrough at least one opening 32 (see FIG. 2), through which a rod 34 (see FIG. 3) is passed. Rotatably connected to rod 34 is a plurality of pulverizing or compacting members 36. (As shown in FIGS. 2 and 5, a portion of the compacting members 36 may be removed so as to increase the compacting efficiency of the compacting members 36). In the preferred embodiment, one compacting member 36 is located between each pair of cylindrical spacing members 30, and there is at least one rod 34/compacting members 36 combination and preferably three such rod 34/compacting members 36 combinations, whereby each combination is spaced a substantially equal distance from the others.

Referring specifically to FIG. 3, the spacing member 30 that is closest to the side of the substantially rectangular housing 20 having the first or right shaft receiving member 26 shall be referred to as the first or right spacing member 30a. The spacing member 30 that is closest to the side of the housing 20 having the second or left shaft receiving member 28 shall be referred to as the second or left spacing member 30b. Two annular members 38 are connected to opposite sides of the housing 20, so as to circumscribe the spacing members 30a and 30b. Preferably, the inner circumference of the annular members 38 is only slightly greater than the circumference of the spacing members 30a and 30b. Such difference should preferably be approximately less than ½ inch. For ease of reference, the annular member 38 circumscribing the right spacing member 30a shall be referred to as the right annular member 38a. The annular member 38 circumscribing the left spacing member 30b shall be referred to as the left annular member 38b. Referring now to FIG. 2, the width of the annular members 38 must be greater than the distance between the wall of the housing 20 nearest the particular spacing member 30 that the annular member 38 is to circumscribe and the proximate side of the particular spacing member 30 that is closest to that wall, and less than the distance between that same wall and the distal side of that same spacing member 30.

Referring now to FIGS. 2–4, at least one and preferably three substantially rectangular cutting members 40 are connected to the sides of spacing members 30a and 30b that are distal annular members 38a and 38b, respectively. Where more than one cutting member 40 is used, such cutting members should preferably be spaced a substantially equal distance apart. The cutting members 40 should be oriented so that a first or proximate end points in the direction of the main shaft 24. As shown in FIGS. 2 and 4, the second or distal end of the cutting members 40 is angled to form a point. Connected to the wall of the housing 20 (as shown in FIG. 4) or to the wall of the housing 20 and an annular member 38 (as shown in FIG. 2) is a cutting member 42. As shown in FIG. 3, there is a cutting member 42a corresponding to annular member 38a and spacing member 30a, and a cutting member 42b corresponding to annular member 38b and spacing member 30b. Like the cutting members 40, the cutting members 42 are preferably rectangular and oriented so as to point towards the main shaft 24. The ends of each of the cutting members 42 that are proximate the main shaft 24 are angled.

OPERATION OF THE INVENTION

During use, the compactor, pulverizer and cutting apparatus 10 of the current invention can, if desired, be towed by a tractor or other vehicle. During operation, the power plant 14 will be turned on and the clutch and transmission apparatus 18 will engage the hammermill 12 so that it may be turned by the power plant 14. As the hammermill 12 revolves about the main shaft 24, the compacting members 36 will rotate in the manner shown in FIG. 5, i.e., the heads of the compacting members 36 will continually be oriented toward the ground, and each respective row of compacting members 36 will, alternatingly, pound down into the ground and waste as the main shaft 24 turns. Ideally, the hammermill 12 should rotate at approximately 900 revolutions per minute. Under these conditions, and with three rows of compacting members 36, the compactor, pulverizer and cutting apparatus 10 can achieve landfill densities in the range of 1500 to 2000 pounds per cubic yard (900 to 1200 Kilograms per cubic meter), substantially better than the 1100 to 1300 pounds per cubic yard provided by traditional compactors. Such increased efficiency permits the use of the compactor, pulverizer and cutting apparatus 10 to increase the useful life of an existing landfill and/or to further compress the waste on a closed landfill so that such closed landfill can be reopened.

When wire, tubing, hoses, plastics, carpet, mattresses, or other like materials are encountered, such materials tend upon encountering the compacting members to work their way toward the walls of the housing 20. In the absence of some appropriate shielding means, these materials will get into contact with the shaft receiving members 26 and/or 28 and bring the operation of the hammermill 12 to a halt. Thus, the annular members 38 serve to shield the shaft receiving members 26 and 28, preventing these materials from interfering with the operation of the main shaft. Then, the wire, tubing, hoses, plastics, carpet, mattresses, and other materials are cut between the angled ends of the cutting members 40 and 42 as the respective cutting members 40 and 42 pass each other during the revolution of the main shaft 24. Preferably, the angled ends of cutting members 40 and 42 should not contact each other when passing by each other during operation of the machine, but should be positioned so that the angled ends pass closely by each other for increased cutting efficiency. The preferred distance between the angled ends is in the range of approximately 1/16 of an inch.

While the invention has been particularly shown and described with reference to preferred embodiments thereof, it will be understood by those skilled in the art that the foregoing and other changes in form and details may be made therein without departing from the spirit and scope of the invention.

I claim:

1. A combined mobile compactor, pulverizer and cutting apparatus comprising, in combination:

a substantially horizontal main shaft located within a substantially rectangular housing;

a first shaft receiving member and a second shaft receiving member located within said housing;

a first end of said main shaft being rotatably connected to said first shaft receiving member located in a first wall of said housing and a second end of said main shaft being rotatably connected to said second shaft receiving member located in a second wall of said housing, said first and second walls of said housing being opposite each other;

shaft driving means coupled to said main shaft for rotating said main shaft;

a plurality of cylindrical spacing members displaced at substantially equal distances along said main shaft, said plurality of cylindrical spacing members including a first spacing member located substantially at said first end of said main shaft, a second spacing member located substantially at said second end of said main shaft, and multiple spacing members located between said first spacing member and said second spacing member;

each of said plurality of spacing members having at least two openings therethrough displaced substantially equal distances from each other, said openings through each of said plurality of spacing members aligned with corresponding said at least two openings in each other of said plurality of spacing members;

at least two rods displaced parallel to said main shaft, each of said rods passing through said aligned openings in said plurality of spacing members;

a plurality of compacting members rotatably connected to each of said two rods;

two of said plurality of spacing members bounding said plurality of compacting members, each of said plurality of compacting members located between said two spacing members;

a first annular member circumscribing said first end of said main shaft and connected to said first wall of said housing, said first annular member having a width that is greater than the distance between said first wall and a proximate side of one of said two spacing members that is located closest to said wall and less than the distance between said first wall of said housing and a distal side of said spacing member that is located closest to said first wall;

first cutting means connected to at least one of said first annular member and said first wall for severing wiring, tubing, hoses, carpet, plastics, mattresses, and other debris;

second cutting means connected to said distal side of said one of said two spacing members that is located closest to said first wall for serving wiring, tubing, hoses, carpet, plastics, mattresses, and other debris in combination with said first cutting means;

a second annular member circumscribing said second end of said main shaft and connected to said second wall of said housing, said second annular member having a width that is greater than the distance between said second wall and a proximate side of said other of said two spacing members that is located closest to said second wall and less than the distance between said second wall of said housing and a distal side of said other of said two spacing members that is located closest to said second wall;

third cutting means connected to at least one of said second annular member and said second wall for severing wiring; tubing, hoses, carpet, plastics, mattresses, and other debris; and fourth cutting means connected to said distal side of said other of said two spacing members that is located closest to said second wall for severing wiring, tubing, hoses, carpet, plastics, mattresses, and other debris in combination with said third cutting means.

2. The combined mobile compactor, pulverizer and cutting apparatus of claim 1 wherein each of said plurality of spacing members has three openings therethrough displaced substantially equal distances from each other;

said three openings in each of said plurality of spacing members aligned with the corresponding three openings in all the other of said plurality of spacing members and having a separate rod passing through each of said three aligned openings; and a plurality of compacting members rotatably connected to each separate rod, each of said plurality of compacting members located between two of said plurality of spacing members.

3. The combined mobile compactor, pulverizer and cutting apparatus of claim 1 wherein said first cutting means comprises a substantially rectangular member oriented in the direction of said main shaft, an end of said first cutting means located closest to said main shaft being angled.

4. The combined mobile compactor, pulverizer and cutting apparatus of claim 3 wherein said second cutting means comprises at least one substantially rectangular member oriented in the same direction as said first cutting means, an end of said second cutting means located farthest from said main shaft being angled.

5. The combined mobile compactor, pulverizer and cutting apparatus of claim 1 wherein said second cutting means comprises at least one substantially rectangular member oriented in the same direction as said first cutting means, an end of said second cutting means located farthest from said main shaft being angled.

6. The combined mobile compactor, pulverizer and cutting apparatus of claim 5 wherein said second cutting means comprises three substantially rectangular members oriented in the same direction as said first cutting means, an end of each of said three substantially rectangular members of said second cutting means located farthest from said main shaft being angled.

7. The combined mobile compactor, pulverizer and cutting apparatus of claim 5 wherein said third cutting means comprises a substantially rectangular member oriented in the direction of said main shaft, an end of said third cutting means located closest to said main shaft being angled.

8. The combined mobile compactor, pulverizer and cutting apparatus of claim 1 wherein said third cutting means comprises a substantially rectangular member oriented in the direction of said main shaft, an end of said third cutting means located closest to said main shaft being angled.

9. The combined mobile compactor, pulverizer and cutting apparatus of claim 8 wherein said fourth cutting means comprises at least one substantially rectangular member oriented in the same direction as said third cutting means, an end of said fourth cutting means located farthest from said main shaft being angled.

10. The combined mobile compactor, pulverizer and cutting apparatus of claim 1 wherein said fourth cutting means comprises at least one substantially rectangular member oriented in the same direction as said third cutting means, an end of said fourth cutting means located farthest from said main shaft being angled.

11. The combined mobile compactor, pulverizer and cutting apparatus of claim 10 wherein said fourth cutting means comprises three substantially rectangular members oriented in the same direction as said second cutting means, an end of each of said three substantially rectangular members of said fourth cutting means located farthest from said main shaft being angled.

12. The combined mobile compactor, pulverizer and cutting apparatus of claim 1 further comprising the feature of a motorized vehicle coupled to said combined mobile compactor, pulverizer and cutting apparatus.

13. A combined mobile compactor, pulverizer and cutting apparatus comprising, in combination:

a plurality of rotatable compacting member means mounted between two spaced apart walls of said apparatus for compacting material coming in contact with said plurality of rotatable compacting member means;

a plurality of rotatable cutting means mounted between two spaced apart walls of said apparatus for cutting said material coming in contact with said plurality of rotatable compacting members; and annular shield means connected to two spaced apart walls of said apparatus for preventing material that is being compacted and cut by said apparatus from interfering with and slowing down rotation of both said plurality of rotatable compacting member means and said plurality of rotatable cutting means.

14. A method for compacting and cutting waste and soil comprising the steps of:

providing a substantially horizontal main shaft located within a substantially rectangular housing;

providing a first shaft receiving member and a second shaft receiving member located within said housing;

rotatably connecting a first end of said main shaft to said first shaft receiving member located in a first wall of said housing and rotatably connecting a second end of said main shaft to said second shaft receiving member located in a second wall of said housing, said first and second walls of said housing being opposite each other;

providing shaft driving means coupled to said main shaft for rotating said main shaft;

providing a plurality of cylindrical spacing members displaced at substantially equal distances along said main shaft, said plurality of cylindrical spacing members including a first spacing member located substantially at said first end of said main shaft, a second spacing member located substantially at said second end of said main shaft, and multiple spacing members located between said first spacing member and said second spacing member;

providing at least two openings through each of said plurality of spacing members displaced substantially equal distances from each other and aligning said openings through each of said plurality of spacing members with corresponding said at least two openings in each other of said plurality of spacing members;

providing at least two rods displaced parallel to said main shaft, each of said rods passing through said aligned openings in said plurality of spacing members;

providing a plurality of compacting members rotatably connected to each of said two rods;

providing two of said plurality of spacing members bounding said plurality of compacting members, each of said plurality of compacting members located between said two spacing members;

providing a first annular member circumscribing said first end of said main shaft and connected to said first wall of said housing, said first annular member having a width that is greater than the distance between said first wall and a proximate side of one of said two spacing members that is located closest to said wall and less than the distance between said first wall of said housing and a distal side of said spacing member that is located closest to said first wall;

connecting first cutting means to at least one of said first annular member and said first wall for severing wiring, tubing, hoses, carpet, plastics, mattresses, and other debris;

connecting second cutting means to said distal side of said one of said two spacing members that is located closest to said first wall for severing wiring, tubing, hoses, carpet, plastics, mattresses, and other debris in combination with said first cutting means;

providing a second annular member circumscribing said second end of said main shaft and connected to said second wall of said housing, said second annular member having a width that is greater than the distance between said second wall and a proximate side of said other of said two spacing members that is located closest to said second wall and less than the distance between said second wall of said housing and a distal side of said other of said two spacing members that is located closest to said second wall;

connecting third cutting means to at least one of said second annular member and said second wall for severing wiring, tubing, hoses, carpet, plastics, mattresses, and other debris; and connecting fourth cutting means to said distal side of said other of said two spacing members that is located closest to said second wall for severing wiring, tubing, hoses, carpet, plastics, mattresses, and other debris in combination with said third cutting means.

15. The method of claim 14 wherein said step of providing said plurality of spacing members further comprises the steps of:

providing three openings through each of said plurality of spacing members displaced substantially equal distances from each other;

aligning said three openings through each of said plurality of spacing members with the corresponding said three openings in each other of said plurality of spacing members and having a separate rod passing through each of said three aligned openings; and rotatably connecting a plurality of compacting members to each said separate rod, each of said plurality of compacting members located between two of said plurality of spacing members.

16. The method of claim 14 wherein said first cutting means comprises a substantially rectangular member oriented in the direction of said main shaft, an end of said first cutting means located closest to said main shaft being angled.

17. The method of claim 16 wherein said second cutting means comprises at least one substantially rectangular member oriented in the same direction as said first cutting means, an end of said second cutting means located farthest from said main shaft being angled.

18. The method of claim 14 wherein said second cutting means comprises at least one substantially rectangular member oriented in the same direction as said first cutting means, an end of said second cutting means located farthest from said main shaft being angled.

19. The method of claim 18 wherein said second cutting means comprises three substantially rectangular members oriented in the same direction as said first cutting means, an end of each of said three substantially rectangular members of said second cutting means located farthest from said main shaft being angled.

20. The method of claim 18 wherein said third cutting means comprises a substantially rectangular member oriented in the direction of said main shaft, an end of said third cutting means located closest to said main shaft being angled.

21. The method of claim 14 wherein said third cutting means comprises a substantially rectangular member oriented in the direction of said main shaft, an end of said third cutting means located closest to said main shaft being angled.

22. The method of claim 21 wherein said fourth cutting means comprises at least one substantially rectangular member oriented in the same direction as said third cutting means, an end of said fourth cutting means located farthest from said main shaft being angled.

23. The method of claim 14 wherein said fourth cutting means comprises at least one substantially rectangular member oriented in the same direction as said third cutting means, an end of said fourth cutting means located farthest from said main shaft being angled.

24. The method of claim 23 wherein said fourth cutting means comprises three substantially rectangular members oriented in the same direction as said second cutting means, an end of each of said three substantially rectangular members of said fourth cutting means located farthest from said main shaft being angled.

25. The method of claim 14 further comprising the step of coupling a motorized vehicle to said combined mobile compactor, pulverizer and cutting apparatus.

* * * * *